No. 780,521. PATENTED JAN. 24, 1905.
P. O. OLSON.
TRIMMING CHUTE.
APPLICATION FILED SEPT. 7, 1904.
2 SHEETS—SHEET 1.
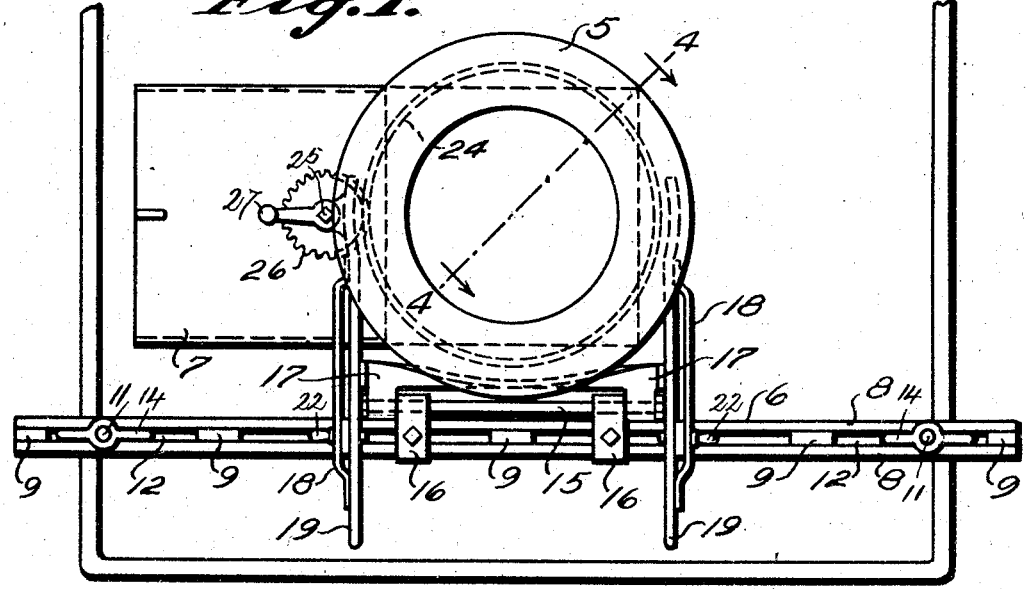
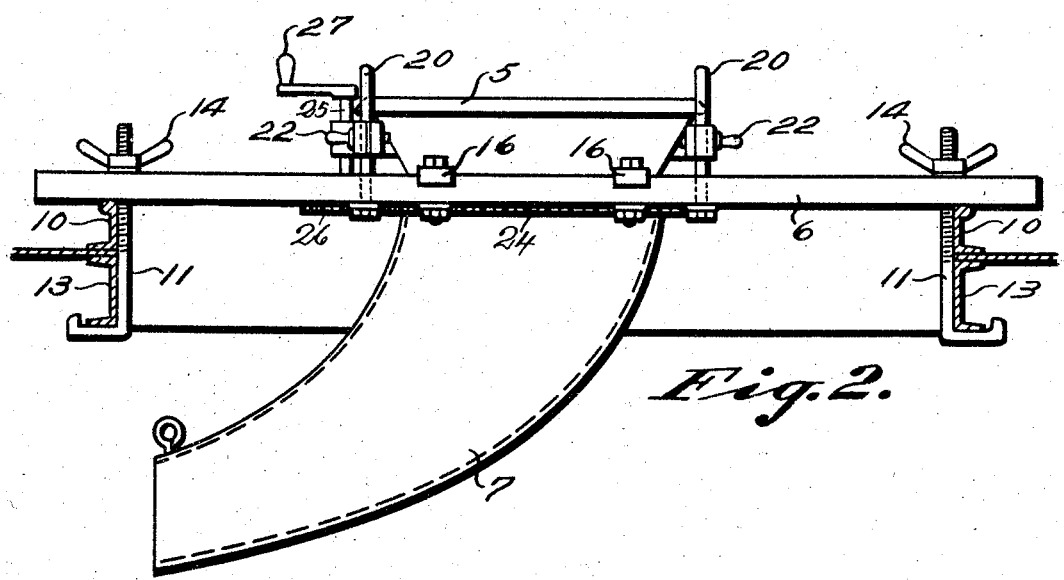

No. 780,521. PATENTED JAN. 24, 1905.
P. O. OLSON.
TRIMMING CHUTE.
APPLICATION FILED SEPT. 7, 1904.
2 SHEETS—SHEET 2.
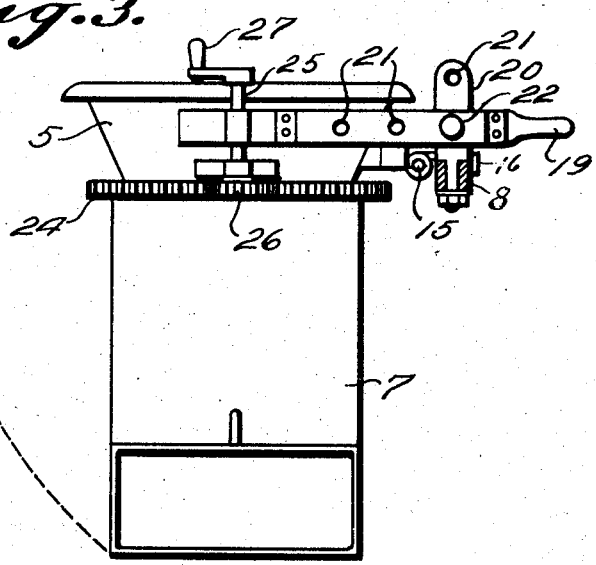
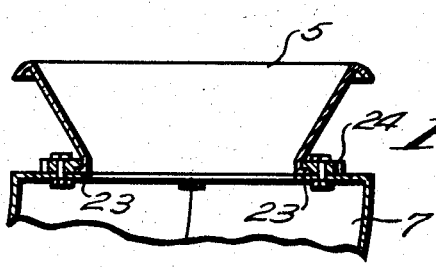

No. 780,521.

Patented January 24, 1905.

UNITED STATES PATENT OFFICE.

PETER O. OLSON, OF CHICAGO, ILLINOIS.

TRIMMING-CHUTE.

SPECIFICATION forming part of Letters Patent No. 780,521, dated January 24, 1905.

Application filed September 7, 1904. Serial No. 223,601.

*To all whom it may concern:*

Be it known that I, PETER O. OLSON, a citizen of the United States of America, and a resident of Chicago, in the county of Cook and State of Illinois, have invented certain new and useful Improvements in Trimming-Chutes, of which the following is a specification.

The main objects of my invention are to provide an improved form of trimming-chute for trimming grain, ore, and the like in the holds of vessels or in cars or bins, to provide a portable supporting-frame for such trimming-chutes which may be readily adjusted for detachably securing the same to hatchways of various sizes, and to provide means for readily adjusting the chute so as to direct the grain in any desired angular direction. I accomplish these objects by the device shown in the accompanying drawings, in which—

Figure 1 is a top plan of a trimming-chute and frame constructed according to my invention. Fig. 2 is a side elevation of the same, showing the beams of a vessel-hatchway in section. Fig. 3 is an elevation of the side which is at the left in Fig. 2. Fig. 4 is a vertical section, partly broken away, on the line 4 4 of Fig. 1, showing the connection between the hopper and spout.

In the construction shown the trimming-chute consists of a hopper 5, secured at one side of a horizontally-disposed beam 6 and having a curved spout 7 secured in alinement with the contracted throat of the hopper. The beam 6 is preferably built up of bars 8, disposed in parallel relation and separated by spacers 9, and is of sufficient length to extend across opposite sides of the coaming 10 of a vessel's cargo-hatch. Clamp-hooks 11 extend through the slot 12 between the bars 8 and are drawn upwardly, so as to grip the deck-beams 13, by means of winged nuts 14, thus rigidly securing the beam in position.

A horizontally-disposed shaft 15 is secured at one side of the beam 6 and in parallel relation to the same by means of bearings 16, which are clamped to the beam 6 by bolts passing through the slots between the beams. The hopper 5 is provided with horizontally-disposed arms 17, which are journaled on the shaft 15 and, together with the bearings 16, form a hinged connection between the hopper and beam. The hopper 5 is also provided with a pair of horizontally-disposed slotted arms 18, which extend across the top of the beam 6 and are provided at their free ends with handles 19, by means of which the hopper 5 may be tilted to the desired angular position by the shaft 15. Uprights 20, rigidly secured to the beam 6, extend through the slots in the beams 18, and said arms and uprights are each provided with a plurality of apertures 21, which register with each other for receiving a locking-pin 22 and securing the hopper 5 in the desired angular position.

The walls of the hopper at the lower end of its throat are provided with an outwardly-projecting annular flange 23, which fits an annular groove formed in the inner periphery of the annular gear 24, which is rigidly bolted to the top of the spout 7. A vertically-disposed shaft 25 is journaled on one side of the hopper 5 and has thereon a pinion 26, meshing with the gear 24. The shaft 25 is provided with a crank 27 for rotating the pinion and causing the spout 7 to rotate relatively of the chute 5.

The operation of the device shown is as follows: The beam 6 is secured across a hatchway through which material, such as grain or ore, is to be delivered and is secured in such position by means of the clamps 11. The material is now fed to the hopper 5 by means of the usual chutes and is directed to any desired part of the hold by turning the spout 7 around the throat of the hopper and tilting the hopper 5 in the desired angular position about the shaft 15. In this way it will be seen that the cargo can be delivered to all parts of the hold without necessitating any more hand-labor than is necessary for guiding the spout 7. Other features of the operation of the device shown will be readily understood from the foregoing description.

It will be seen that numerous details of the construction shown may be altered without departing from the spirit of my invention.

What I claim as my invention, and desire to secure by Letters Patent, is—

1. A device of the class described, comprising a supporting-frame; a hopper mounted on the frame and adapted to be tilted on a horizontally-disposed axis in said frame; and a spout secured in alinement with the throat of the hopper and rotatable relatively thereof; and mechanism for rotating said chute, substantially as described.

2. A device of the class described, comprising a frame; a hopper mounted in the frame and adapted to be tilted on a horizontal axis in the frame; a spout secured in alinement with the throat of said hopper and rotatable relatively thereof; an annular gear secured to the spout; a pinion journaled on the hopper and meshing with said gear; and means for rotating said pinion and thereby causing the spout to turn relatively to the hopper, substantially as described.

3. The combination of a portable frame having means for detachably securing the same to a hatchway; a vertically-disposed hopper mounted on said frame and adapted to be tilted on a horizontally-disposed axis; a spout secured in alinement with the throat of said hopper and rotatable relatively thereof, substantially as described.

4. The combination of a portable frame having means for detachably securing the same to a hatchway; a vertically-disposed hopper mounted on said frame and adapted to be tilted on a horizontally-disposed axis; means for securing said hopper in a plurality of different angular positions about said axis; a spout secured in alinement with the throat of said hopper and rotatable relatively thereof, substantially as described.

5. The combination of a beam having clamps for detachably securing the same across a hatchway; a vertically-disposed hopper mounted on said beam at one side of the same and adapted to be tilted relatively thereof on a horizontal axis; a spout secured in alinement with the throat of the hopper and rotatable relatively thereof, substantially as described.

6. The combination of a beam; clamps secured to the beam for detachably securing the same across a hatchway, said clamps being slidable longitudinally of the beam to suit hatchways of various widths; a vertically-disposed hopper mounted on said beam at one side of the same and adapted to be tilted relatively thereof on a horizontal axis; a spout secured in alinement with the throat of the hopper and rotatable relatively thereof, substantially as described.

Signed at Chicago this 25th day of August, 1904.

PETER O. OLSON.

Witnesses:
EUGENE A. RUMMLER,
GLEN C. STEPHENS.